United States Patent Office 3,069,233
Patented Dec. 18, 1962

---

3,069,233
PROCESS FOR CONVERTING NITROSYL CHLORIDE TO NITROGEN OXIDE AND AN AQUEOUS SOLUTION OF ACIDS
Gerlando Marullo and Giacomo Lazzari, Novara, and Giorgio Alessandrini, Porto Marghera, Venice, Italy, assignors to Montecatini-Societa Generale per l'Industria Mineraria e Chimica, Milan, Italy, a corporation of Italy
No Drawing. Filed June 22, 1961, Ser. No. 119,002
Claims priority, application Italy June 24, 1960
4 Claims. (Cl. 23—157)

It is known that in the preparation of alkaline nitrates by the action of nitric acid on alkaline chlorides, the formation of nitrosyl chloride occurs according to the following reaction:

$$3MCl + 4HNO_3 \rightarrow 3MNO_3 + Cl_2 + NOCl + 2H_2O$$

(wherein M represents an alkali metal).

Many proposals have been made for the utilization of nitrosyl chloride as such or for its transformation to chlorine. The utilization of nitrosyl chloride has been till now, of very limited importance; whereas, on the other hand, the conversion of said compound to chlorine is a rather complex process, which generaly affords unsatisfactory results.

It is an object of our invention to convert nitrosyl chloride to other substances having a practically immediate employment.

We have found that nitrosyl chloride reacts readily with sulphur dioxide in the presence of water, yielding gaseous nitrogen oxide and a solution of sulphuric and hydrochloric acids.

It is therefore a more specific object of our present invention to provide a process for converting the nitrosyl chloride to nitrogen oxide and an aqueous solution containing sulphuric and hydrochloric acids, which comprises reacting gaseous nitrosyl chloride with sulphur dioxide in the presence of water.

Reaction of nitrosyl chloride with sulphur dioxide occurs according to the following equation:

$$2NOCl + SO_2 + 2H_2O \rightarrow 2NO + H_2SO_4 + 2HCl$$

The reaction occurs spontaneously at high rate and is strongly exothermic.

Sulphur dioxide may be employed in said reaction either in gaseous form or as a concentrated and saturated aqueous solution (90–100 g. $SO_2$ per liter), which may be readily obtained for instance by dissolving the roasting gases of sulphur or pyrites in an adsorption tower with water under a pressure of a few atmospheres.

When nitrosyl chloride is directly reacted with sulphuretted gases originating from roasting of sulphur or pyrite (which have frequently a rather high air content) a remarkably higher quantity of $SO_2$ will be consumed than in both mentioned cases; since the air contained in the sulphuretted gas, partially oxidizes the produced NO to $NO_2$, with formation of nitric acid, which in turn will have to be reduced by a further amount of $SO_2$. In this case a remarkable amount of nitrogen, as nitrous acid, remains in the aqueous solution containing sulphuric and hydrochloric acids; this amount cannot be recycled in the nitric acid production plant, so that from the viewpoint of nitrogen recovery it must be considered lost.

Impure nitrosyl chloride may also be employed, without impairing the process performance, e.g. it may contain a certain amount of free chlorine which also shall react with $SO_2$ to form $H_2SO_4$ and HCl (in this case an increased amount of sulphur dioxide will be consumed). The same is also true for $NO_2$ impurities.

According to the process of our invention, the NOCl nitrogen is practically recovered quantitatively in the form of NO, whereas the solution containing sulphuric and hydrochloric acids proves to be nitrogen free. Concentrations up to 12 acid equivalents per liter are attainable in the acid solution obtained by NOCl decomposition, when using pure gaseous $SO_2$; acid concentrations of about 5 N are obtained in acidic solutions when employing $SO_2$ in saturated aqueous solution. Weight ratio between HCl and $H_2SO_4$ is about 1:1.5. The nitrogen oxide obtained according to the present invention may be utilized, without further purification, in the nitric acid production plant.

The process according to the present invention may be also carried out in two distinct stages, for example by first feeding nitrosyl chloride and water countercurrently into the reactor so as to obtain gaseous nitrogen oxide and a mixture of nitric acid, hydrochloric acid, chlorine and unreacted nitrosyl chloride in the reactor. This reaction is endothermic. Gaseous or dissolved sulphur dioxide is added to the end product of said reaction, until the complete discoloration of product is attained; the reaction with $SO_2$ is exothermic. About half the amount of nitrogen oxide produced during said reaction is developed during the first stage, and half during the second stage.

However, it is less profitable to proceed in two distinct stages, since the chemical strength of construction material of reactor is severely impaired due to the strongly corrosive substances produced, whereas by reacting NOCl simultaneously with water and sulphur dioxide the material corrosion requirements are less severe.

In addition to metallic materials of construction, ceramic materials may be employed, since only moderate temperatures are attained, and no need occurs of heat supply from outside.

The following examples are given in order to illustrate, not to restrict, the scope of this invention.

*Example 1*

Equipment consisting of a 1 liter glass flask is provided with two gas distributors and on which a short small column with Raschig packing is superposed, having on top a water containing tap funnel. The top of the small column is connected, through a gas development pipe, to a water washing column and to a water gasometer. 50 ml. water are charged in the flask, so that both gas distributing pipes draw therein. The whole equipment is washed with a nitrogen stream, then a gaseous stream of $SO_2$ and of gasified NOCl are simultaneously conveyed in the reaction flask. A nearly double volume of NOCl in comparison to $SO_2$ is conveyed. The reaction occurs instantaneously with strong release of gaseous nitrogen oxide, which accumulates in the gasometer. Feeding of NOCl and $SO_2$ is adjusted so that a uniform rate of gaseous development as well as a constantly colorless reaction liquid are obtained; in fact the liquid becomes brown-red colored as soon as $SO_2$ is lacking. Color observation is a very simple and rapid principle in order to adjust the reaction course. As reaction proceeds and sulphuric acid concentration in liquid increases, the reaction rate decreases, owing to the formation of greater amounts of nitrosyl-sulphuric acid, which does not react so readily as NOCl. It is then necessary to introduce in the reaction flask, from the top of the therein superposed small column, an amount of water so as to suitably dilute the reaction mixture present in the flask and re-establish a regular reaction rate which can be followed from the gaseous development rate. The water introduced in this way also provides a first washing of NO gas from vapors of the not yet decomposed NOCl, by bringing them again in the reaction flask. The liquid temperature increases during the reaction to about 65° C. The following amounts of reagents have been fed: pure NOCl 81.5 g.; gaseous $SO_2$ 47.0 g.; water 325 ml. The whole feeding duration has been 1 hour 34 minutes. 410 g. of concentrated acidic solution were obtained, having a density 1.17, containing 70.0 g. $H_2SO_4$ and 45.0 g. HCl, 0.024 g. $HNO_3$ and 1.2 g. $SO_2$ dissolved in excess. In the gasometer 27.0 N liters NO were collected. Accordingly, the concentration of acid obtained is:

| | G./l. |
|---|---|
| $H_2SO_4$ | 195.5 |
| HCl | 125.0 |
| $HNO_3$ | 0.066 |
| $SO_2$ | 3.33 | and contains about 7.5 acid equivalents per liter.

Nitrogen of NOCl is recovered as NO, with a yield of 97.5%; sulphur of $SO_2$ is converted to sulphuric acid with a yield of 97.5%; chlorine of NOCl is converted to hydrochloric acid, with a practically quantitative yield. Molar ratio between formed $H_2SO_4$ and HCl is 1:1.73.

Example 2

In this test, which is carried out analogously to that described in Example 1, are introduced:

| | G. |
|---|---|
| Gaseous NOCl | 80 |
| Liquid $H_2O$ | 150 |
| Gaseous $SO_2$ | 37.64 |

After 1 hour 30 minutes of reaction, the following products are obtained:

Pure gaseous NO 36.0 g. (equal to 16.8 g. $N_2$)

Acidic solution 180.0 ml. having a density 1.22 and the composition:

| | g./l. |
|---|---|
| $H_2SO_4$ | 312 |
| HCl | 220 |
| $HNO_3$ | 0.089 |
| $SO_2$ | 2.46 | containing 12 acid equivalents per liter.

Yield of NO: 95%; yield of $H_2SO_4$: 97.6%.

Example 3

50 ml. aqueous saturated solution of $SO_2$ are charged in the apparatus described in Example 1.

NOCl vapor and an aqueous saturated solution of $SO_2$ are simultaneously fed; the latter is introduced through the distributing pipe employed in Example 1 for the addition of gaseous $SO_2$.

Simultaneous feeding of both reactants is carried out according to the same principles set forth in Example 1.

On the whole are introduced:

Gaseous NOCl = 77 g.

Aqueous solution $SO_2$ with 106 g./l. = 470 ml. (equal to 50 g. $SO_2$).

After 1 hour 20 minutes of reaction at 65° C., the following products are obtained:

Pure gaseous NO 25 N liters, i.e. 33.5 g. (equal to 15.7 g. of $N_2$).

Aqueous solution 485 ml. (density 1.13) containing:

| | g./l. |
|---|---|
| $H_2SO_4$ | 149 |
| HCl | 83.7 |
| $HNO_3$ | 0.78 |
| $SO_2$ | 2.9 | i.e. 5.3 acid equivalent per liter.

Yield of NO is 95%; that of $H_2SO_4$ is 94.5%.

We claim:

1. A process for converting nitrosyl chloride to nitric oxide and an aqueous solution containing sulphuric and hydrochloric acids, which comprises reacting nitrosyl chloride with sulphur dioxide in the presence of water and separating the gaseous nitric oxide from the aqueous solution of sulphuric and hydrochloric acids.

2. A process for converting nitrosyl chloride to nitric oxide and an aqueous solution containing sulphuric and hydrochloric acids, which comprises reacting nitrosyl chloride in gaseous form, with sulphur dioxide in the presence of water and separating the gaseous nitric oxide from the aqueous solution of sulphuric and hydrochloric acids.

3. A process for converting nitrosyl chloride to nitric oxide and an aqueous solution containing sulphuric and hydrochloric acids, which comprises reacting nitrosyl chloride in gaseous form, with a sulphur dioxide containing gas in the presence of water, said sulphur dioxide containing gas having a sulphur dioxide content of at least 90% and separating the gaseous nitric oxide from the aqueous solution of sulphuric and hydrochloric acids.

4. A process for converting nitrosyl chloride to nitric oxide and an aqueous solution containing sulphuric and hydrochloric acids, which comprises reacting nitrosyl chloride in gaseous form, with aqueous sulphur dioxide solution, said solution containing from about 90 to 100 g. sulphur dioxide per liter of solution and separating the gaseous nitric oxide from the aqueous solution of sulphuric and hydrochloric acids.

References Cited in the file of this patent

UNITED STATES PATENTS 1,036,611    Guye et al. _____ Aug. 27, 1912

FOREIGN PATENTS 13,025    Great Britain _____ 1884